A. BÖRINGER.
PROCESS FOR MANUFACTURING COMPOSITE TUBES AND OTHER ARTICLES.
APPLICATION FILED DEC. 10, 1907.

946,325.

Patented Jan. 11, 1910.

Witnesses
M. W. Darg.
L. G. Pride.

Inventor
August Böringer
By Wm E Boulger
attorney

UNITED STATES PATENT OFFICE.

AUGUST BÖRINGER, OF BENSBERG, GERMANY.

PROCESS FOR MANUFACTURING COMPOSITE TUBES AND OTHER ARTICLES.

946,325.  Specification of Letters Patent.  Patented Jan. 11, 1910.

Application filed December 10, 1907. Serial No. 405,972.

*To all whom it may concern:*

Be it known that I, AUGUST BÖRINGER, a subject of the German Emperor, residing at Bensberg, Rhineland, in Germany, have invented a certain new and useful Process for Manufacturing Composite Tubes and other Articles, of which the following is a specification.

This invention relates to a process for providing tubes or articles of solid cross-section of any desired material with a covering of wood.

The process is illustrated in the accompanying drawing, in which:—

Figure 1:
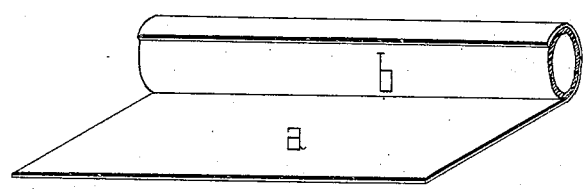
Figure 2:
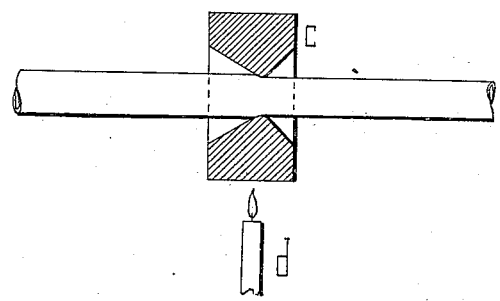

Figure 1 shows the rolling of a veneer on a tube, and Fig. 2 the securing of the same by drawing through a draw plate.

The process consists in very fine or thin veneer $a$ being coated on the back with a glue, and in winding the said veneer, for instance, on a steel tube $b$ and thereupon drawing the said tube through a suitably heated draw plate $c$. The appearance of the steel tube cannot then be distinguished from that of a wooden tube, and such tubes can be used for various purposes, such as for instance umbrella sticks, insulating tubes, and so forth.

What I claim as my invention and desire to secure by Letters Patent is:—

1. A process for manufacturing composite articles consisting in coating a core with veneer plates and passing the whole through a heated draw-plate.

2. A process for manufacturing composite articles consisting in coating thin wooden plates with glue, winding said plates upon a metal core and finally passing the whole through a heated draw-plate.

In testimony whereof I have signed my name to this specification in the presence of two subscribing witnesses.

AUGUST BÖRINGER.

Witnesses:
 LOUIS VANDORN,
 BESSIE F. DUNLAP.